Feb. 13, 1968 T. P. LEARY 3,369,240
RANGE AND BEARING INDICATION OF GEOGRAPHICALLY
REMOTE SOURCES OF ELECTROMAGNETIC RADIATION
Filed Aug. 29, 1966 4 Sheets-Sheet 3
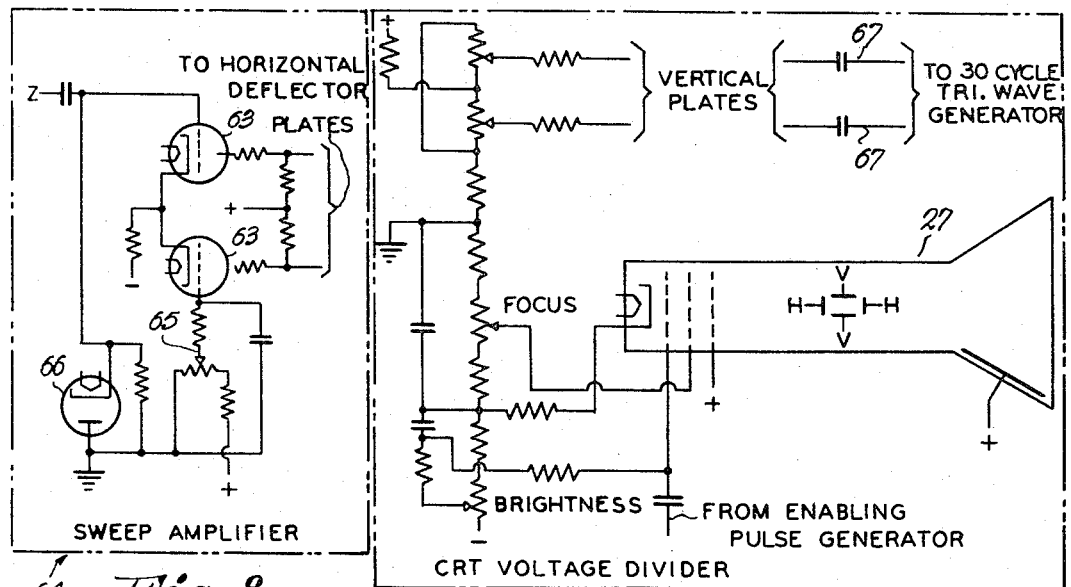
Fig. 8.
Fig. 9.
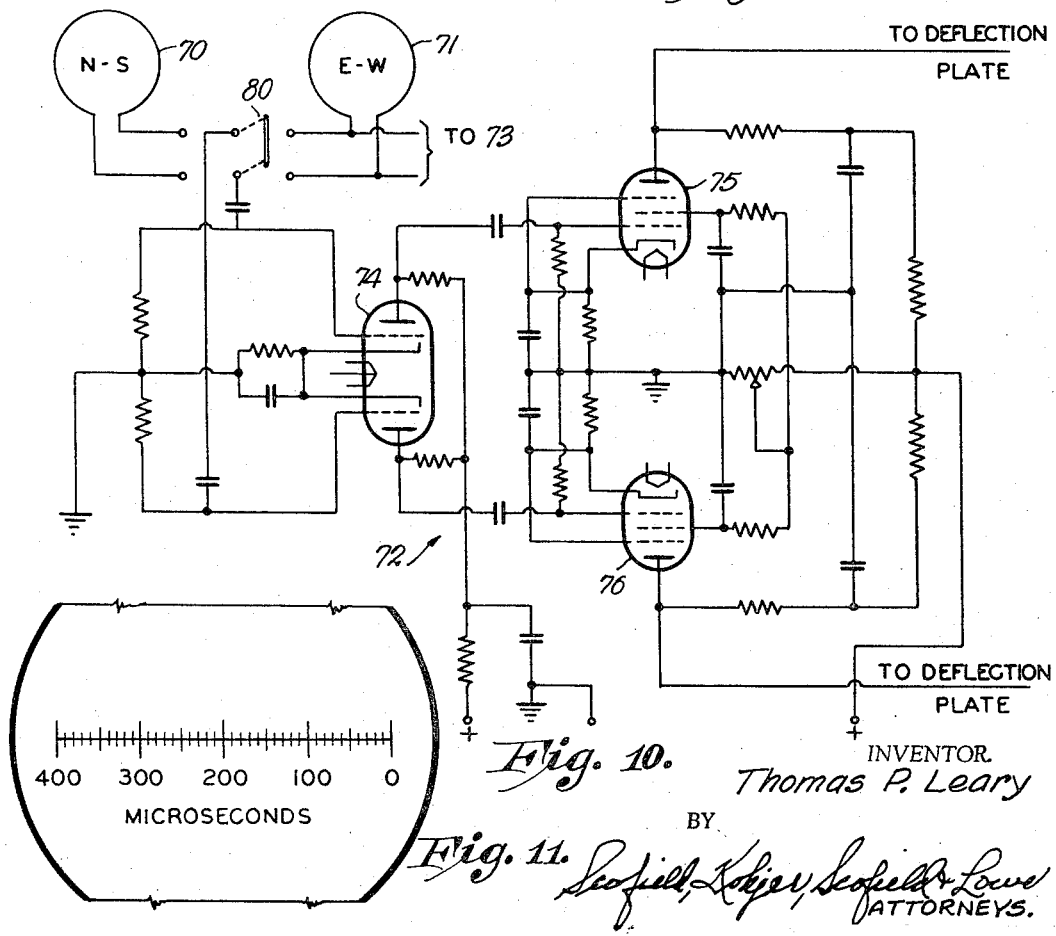
Fig. 10.
Fig. 11.
INVENTOR.
Thomas P. Leary
BY
ATTORNEYS.

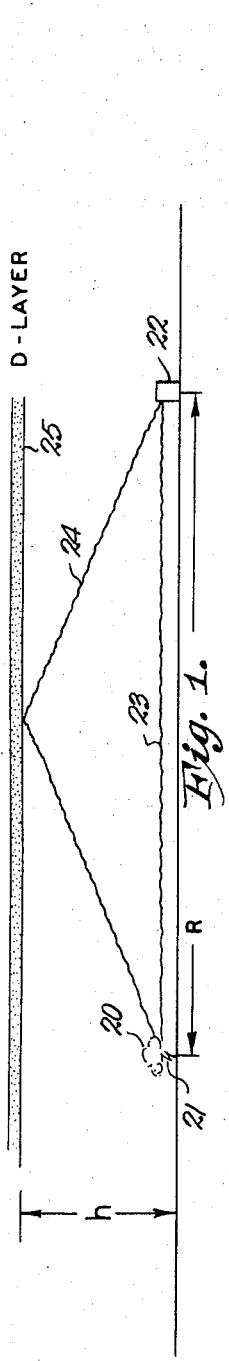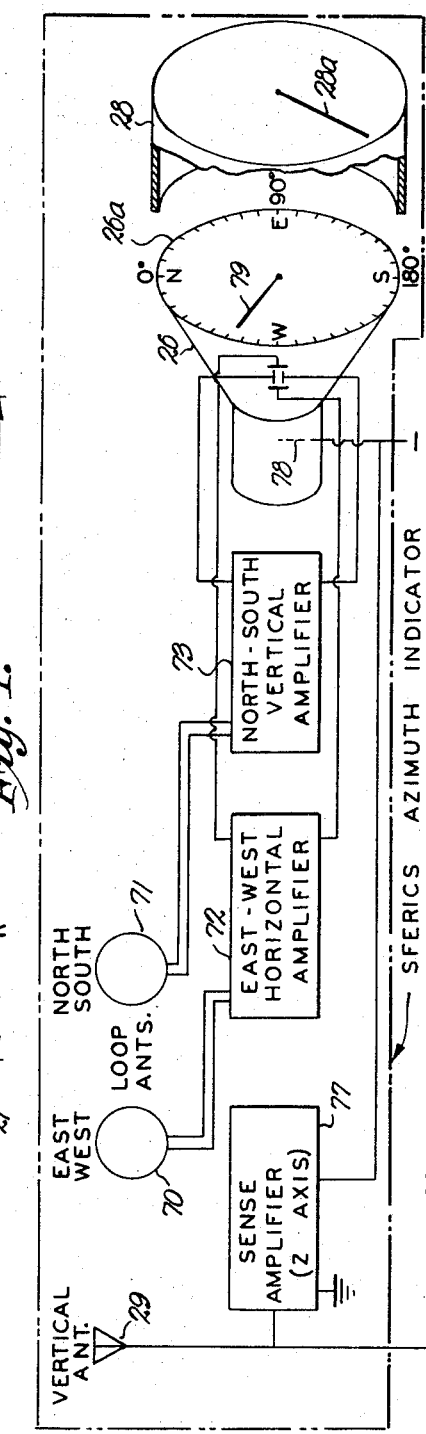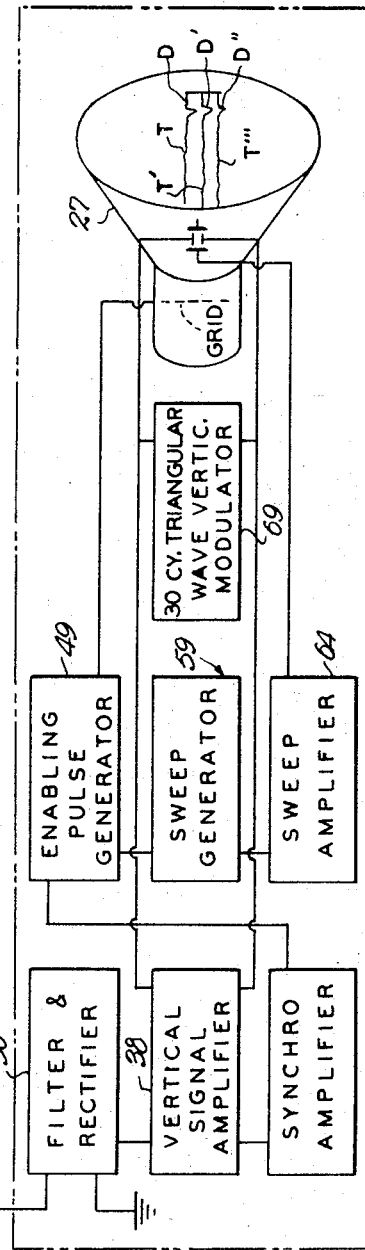

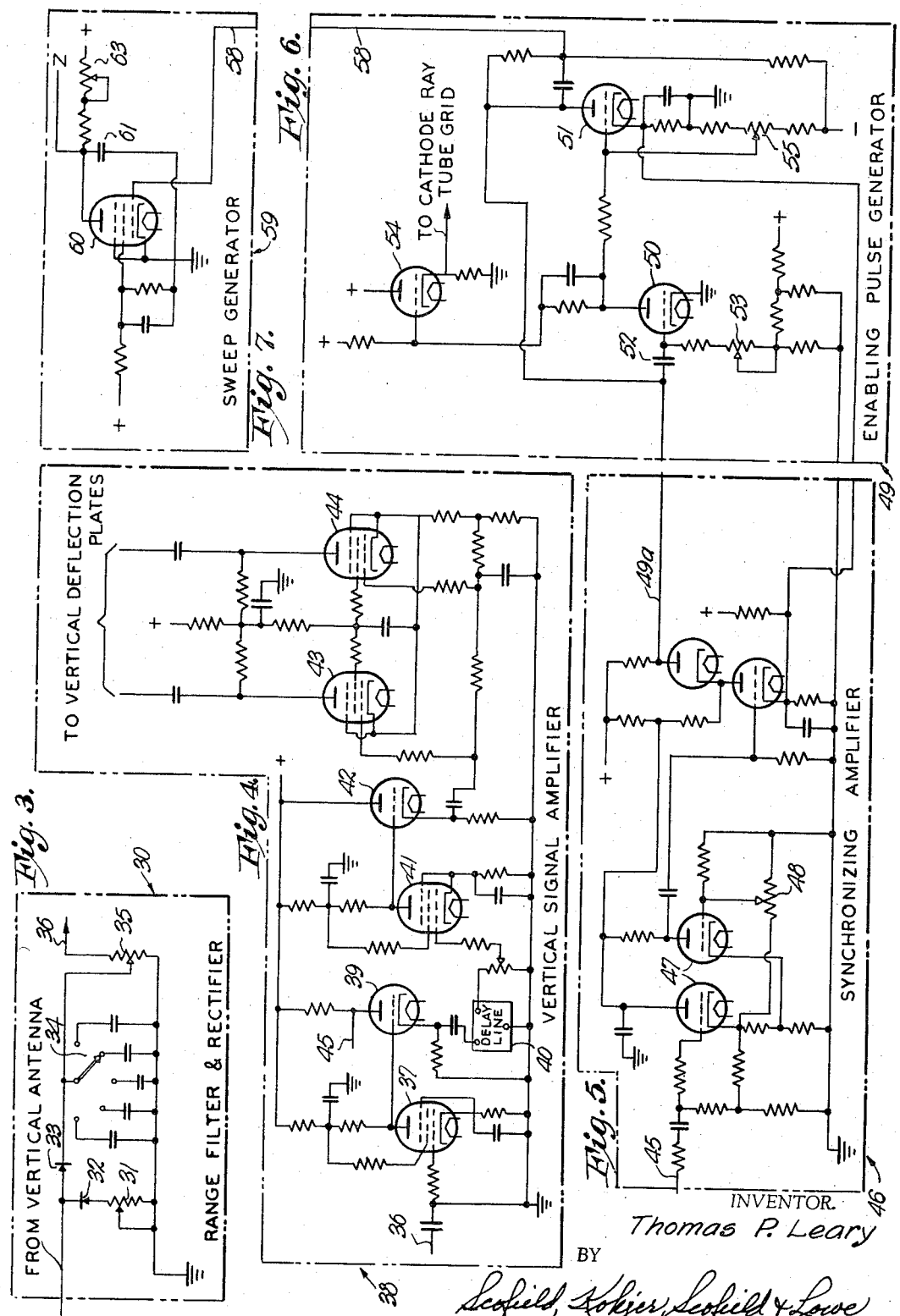

INVENTOR
Thomas P. Leary

United States Patent Office 3,369,240
Patented Feb. 13, 1968

3,369,240
RANGE AND BEARING INDICATION OF
GEOGRAPHICALLY REMOTE SOURCES
OF ELECTROMAGNETIC RADIATION
Thomas P. Leary, 1212 First National Bank Bldg.,
Omaha, Nebr. 68102
Continuation-in-part of application Ser. No. 313,232,
Oct. 2, 1963. This application Aug. 29, 1966, Ser.
No. 593,229
18 Claims. (Cl. 343—112)

This application is a continuation-in-part of my application Serial No. 313,232, filed Oct. 2, 1963, titled "Range and Bearing Indication of Geographically Remote Sources of Electromagnetic Radiation."

This invention deals generally with means for detecting the presence and determining the location from a relatively remote point of a source of vertically polarized, high amplitude pulses of electromagnetic radiation in the ELF frequency range, and refers more particularly to the provision of such a means requiring but a single observation station to determine both azimuth and range of the source. The principal use presently envisaged for the invention is in the practical and instantaneous locating of electrically developing or active storm cells from a single station, which station may be located hundreds of miles from the storm cell as distinguished from the relatively short range observation distances now provided by radar.

It is generally known that certain meteorological disturbances, such as convective storms, are accompanied by lightning discharges which in turn generate low frequency radio signals of considerable power. Variously these signals are known as atmospherics, or as now more popularly termed, "sferics." Efforts have been made toward the utilization of such signals to ascertain from distant points the precise location of the disturbance. However, and to the best of my knowledge, the proposals heretofore made have been based on the simultaneous measuring of the bearing or azimuth of a sferic source from a plurality of widely separated receiving stations whereby a range fix on the cell can be obtained by intercommunication and by known methods of triangulation. Examples and explanations of the principles of operation of such known systems can be found in the issued patents to Skurnick, 2,402,688, issued June 25, 1946; Kass 2,684,474, issued July 20, 1954 and Steelman, 2,864,081, issued Dec. 9, 1958.

One of the principal objectives of the present invention is to provide a system which, while it may have other uses, is specially suitable for determining the range and bearing of a vertical lightning discharge from a single receiving station rather than a plurality of widely separated stations. Through such an arrangement, substantial economies in first cost, equipment and manpower can be achieved and the necessary investment to build an operative station is thus held to a level which promotes substantial use.

Another important object of the invention is to provide a system of the character described which facilitates relatively accurate measurement of both bearing and range of an electrically active storm cell and which also enables the operator to discriminate between highly active and relatively inactive developing or declining cells. The latter part of ths object is achieved by providing a system which is operable to provide a means of discriminating between vertical lightning discharges, such as cloud-to-ground and strong, vertical intracloud strokes, and the weak, horizontal cloud-to-cloud strokes.

Still another object of the invention is to provide a simple and effective means of determining range indicating and bearing fixes on an electrically developing or active storm cell and displaying them in such fashion that they may be visually read at the moment of reception. Stated otherwise, it is an object of my invention in this respect to provide a visual observation system in which the necessary information can be read directly from the equipment and which does not require photographic or other recording means to accomplish its basic purpose.

A further object of the invention is to provide means for the purposes described in which the azimuth signals can be displayed in conjunction with radar observations and on the same cathode ray tube.

Another object of the invention is to provide means for adequately translating the received sferics signal into the appropriate visual displays and presenting an immediately determinable and directly readable source of the range indicating and bearing measurements and thus locating the position of such signal.

A further object of the invention is to provide means to locate sources of electrical activity of the character described, including particularly severe weather occurrences, at long range by passive apparatus which does not depend for its operation on any emitted signal from the station.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views;

FIG. 1 is a diagrammatic view illustrating a typical storm cell and the paths of the sferic ground wave and sky wave to the observation station;

FIG. 2 is a schematic representation in block form showing the receiving and display system at the observation station;

FIG. 3 is a schematic representation of the filter and rectifier of the range indicator component of the system;

FIG. 4 is a schematic representation of the vertical signal amplifier of the range indicator component of the system;

FIG. 5 is a schematic representation of the synchronizing amplifier of the range indicator component of the system;

FIG. 6 is a schematic representation of the enabling pulse generator of the range indicator component of the system;

FIG. 7 is a schematic representation of the sweep generator of the range indicator component of the system;

FIG. 8 is a schematic representation of the sweep amplifier of the range indicator component of the system;

FIG. 9 is a schematic representation of the voltage divider and manner of connection of the 30-cycle triangular wave generator with the vertical deflector plates of the cathode ray tube of the range indicator component of the system;

FIG. 10 is a schematic representation of an amplifier (either North-South or East-West) of the azimuth indicator component of the system;

FIG. 11 is a front view of a typical cathode ray tube face etched to provide the elapsed time measuring scale utilized in conjunction with the range indicator component of the system.

Figure 12:
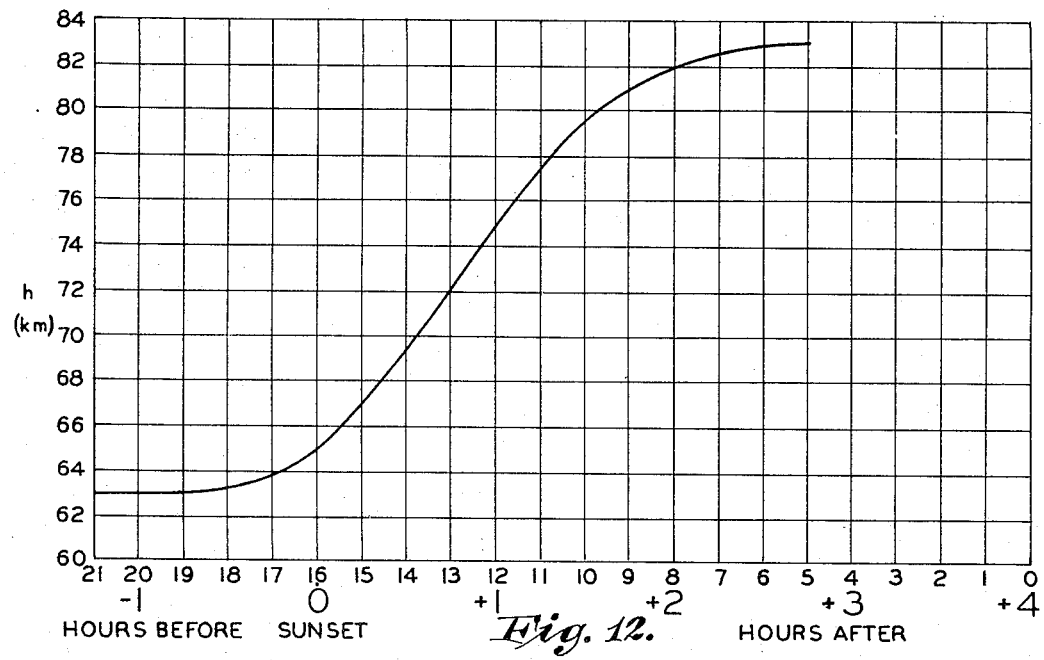
FIG. 12 is a plot of the altitude of the D-layer in relation to time intervals prior to and following sunset.

Referring now to the drawings, and initially to FIGS. 1 and 2, the present invention relies upon three principal natural phenomena for its operation. The first of these is one mentioned earlier, namely the radiation from lightning discharges of strong pulses of radio energy, including ELF (extremely low frequency) frequencies. For the purposes of this application, ELF means in the range of about 100–10,000 c.p.s. The second and third phenomena are the phenomena apparently heretofore unrecognized as of potential usefulness in obtaining meteorological information, principally with respect to determining the location of storm cells and these are:

(a) The fact that the D-layer of the ionosphere is capable of refracting ELF sferic signals, both by day and night, provided that the signal is of sufficient strength and that the altitude of the D-layer can normally be predicted with relation to the time of sunset at a point on the earth directly below the refraction area of the layer; and (b) The tendency of ELF waves originating from high strength lightning discharges to undergo a phase reversal as they are refracted and scattered by the layer.

Better understanding of the foregoing phenomena and the part they play in the instant invention may be obtained by referring to FIG. 1 of the drawings. In this figure, reference numeral 20 indicates an electrically active storm cell in which is occurring a strong cloud-to-ground lightning discharge 21. As we have previously seen, the discharge creates a sferic signal in the form of radio energy which is propagated in all directions.

The observation station fitted with the system of the instant invention is located at 22 and may be regarded as many miles distant from the storm cell, as much as 900 miles under good conditions. The radio pulses from the lightning discharge can be regarded as arriving at the observation station in two fundamental components. The first component is what is commonly called the "ground wave" and this is indicated at 23. The second is the "sky wave." This wave, indicated at 24, is created as the result of the refractive action of the D-layer 25 of the ionosphere. Upward propagations of the ELF waves reach the D-layer and are refracted back toward earth. As earlier noted, I have discovered that these waves undergo a phase reversal during refraction, and the importance of this will be made clear as the description proceeds.

*The system in general*

In the preferred embodiment and as illustrated in FIG. 2, the receiving and information display system at the station 22 comprises two major groupings of components, each grouping of which terminates in a cathode ray tube on the screens of which are displayed the range indicating and azimuth information. The first grouping is identified as the azimuth indicator and has the cathode ray tube 26. The second grouping is gathered together under the title range indicator and has the tube 27.

The tubes 26 and 27 are, when installed in a working system, located physically closely adjacent one another with their screens facing in the same direction so that the two screens will be observable simultaneously by a single observer. The faceplate of the azimuth tube 26 is etched at its rim, or has otherwise applied, a compass scale 26a. For purposes to be later described, a transparent lens 28 can be sleeved rotatably over the end of the tube 26. This lens has etched into it a radial line 28a.

The face of the range indicator tube is shown in FIG. 1 as bearing a typical display of the actual range traces T, T′, T″ which appear during operation. While not shown in detail in FIG. 1, but as is shown in detail in FIG. 11, the faceplate of tube 27 has etched or otherwise inscribed on it an elapsed time scale. The manner of use of this scale in determining the range of the sferic will later be described. The reason for not including the scale in the schematic diagram of FIG. 2 is to facilitate a description and understanding of the nature of the range trace.

*The range indicator circuit*

Taking up now the circuitry and apparatus utilized for the range indicator part of the overall system, the sferics signal is received on a vertical antenna 29 and conducted to the filter and rectifier 30, the details of which are seen in FIG. 3. The antenna should have a length of 30 or more feet.

The filter is designed with a band pass range of from 100 to 10,000 cycles which is, as is evident, in the extremely low frequency band. For the purposes of the present application, and as earlier noted, the term ELF is used to indicate 100–10,000 cycle range utilized in the present invention.

The initial potentiometer 31 and diode 32 serve to reduce the potential pick-up from any nearby power lines and determine the lower end of the range. A second diode 33 partially demodulates the signal and a selective condenser 34 connected across to ground is provided which serves to remove the higher frequency components modulating the signal. The higher frequencies, unless removed, have tendencies to blur the trace finally obtained upon the range indicator tube. A final potentiometer 35 is provided for adjusting or attenuating the signal to the desired potential.

The signal is fed from the filter-rectifier through conductor 36 to the pentode audio amplifier tube 37 in the vertical signal amplifier network 38 (FIG. 4) and to the cathode-follower 39. The cathode circuit of tube 39 has located therein a lumped-constant delay line 40 designed to provide a controlled delay, for example 0.5 microsecond, in the signal fed from the delay line. As will be seen, this time delay arrangement permits the horizontal sweep of the tube 27 to start slightly before the initial ground wave triggering signal is displayed on the screen.

From the delay line 40, the delayed signal is amplified again in a pentode-audio amplifier 41 and the output of the latter is fed to another cathode-follower 42. The unbalanced output of the latter is applied to the grid and cathode, respectively, of two push-pull pentode audio amplifiers 43, 44 which serve to convert the signal into two equal voltages of opposite polarity. These balanced signal voltages are then conducted to the opposing vertical deflection plates of the range indicator tube 27.

The undelayed portion of the signal is taken from the the plate of cathode-follower tube 42 by conductor 45 and is fed to the synchronizing amplifier 46 (FIG. 5), being applied to the grid of synchronizing amplifier tubes 47 therein. A sync voltage potentiometer 48 is provided in the synchronizing amplifier to permit adjustment of the sensitivity of the pulse generator 49 (FIG. 6) to which the signal is fed from the synchronizing amplifier and also to permit the pulse generator to be started by signals of negative polarity.

The amplified signal voltage is led by conductor 49a to the enabling pulse generator 49 shown in FIG. 6. This generator is a one-shot multivibrator circuit that produces a square wave of variable length and duration to sweep the electron beam of the range indicator tube 27. The triggering pulse enters the grid of the triode 50. This triode, when dormant, is fully conducting with its grid held at cathode potential. The pulse drives the grid toward cutoff causing the plate potential to increase. The increase is applied to the triode 51 and conduction begins therein. As a result, the potential at the plate of triode 51 decreases and initiates a negative pulse back through the capacitor 52 to the grid of the triode 50, reinforcing the starting pulse. Consequently, the multivibrator oscillation commences, the rate of oscillation depending upon the value of capacitor 52 and the setting of potentiometer 53. The oscillation continues until triode 50 is completely cut off and nonconducting, and triode 51 is fully conducting. As soon as capacitor 52 discharges through the grid resistance of triode 50, the grid voltage rises again until equal to the cathode potential and on until it passes through the cutoff point; then a recovery transient occurs. Triode 50 becomes conducting again and the grid of triode 51 is driven negative to cutoff and its plate voltage rises sharply to its dormant potential.

The positive pulse from the plate of triode 51 of the enabling pulse generator is connected to the grid of triode 54 (a cathode-follower) and the low impedance positive pulse from the cathode circuit is used to raise the grid potential (see FIGS. 2 and 9) of the range indicator tube 27, thus releasing the electron beam for its sweep across the tube. The cathode circuit of triode 51 includes a stability control 55. This control permits adjustment of the dormant voltage of the grid and, therefore, the sensitivity and stability of the circuit. The cathode of triode 51 in the enabling pulse generator 49 (FIG. 6) and the cathode of the second stage of the synchronizing amplifier 46 (FIG. 5) are connected together through a common resistance 56 and capacitance 57, which disables the synchronizing amplifier during the action of the enabling pulse generator. This prevents a following signal pulse from activating the pulse generator or disturbing its action until the cycle is completed.

The negative pulse from the plate of triode 50 of the pulse enabling generator is led by conductor 58 to the sweep generator 59 shown in detail in FIG. 7, and to the grid of the pentode 60 thereof. The purpose of the sweep generator is to generate a linearly rising sawtooth wave to be used for sweeping the beam of the range indicator tube horizontally at a uniform rate. The sweep rate produced is dependent on a value of the capacitance 61 and setting of potentiometer 62, which is ganged with potentiometer 55 in the enabling pulse generator. The positive sawtooth wave is connected to one of the grids of the push-pull sweep amplifier tube 63 of the sweep amplifier 64 (FIG. 8).

The position of the electron beam at the beginning of the sweep is adjusted by means of the potentiometer 65 in the grid circuit of one of the sweep amplifier tubes while the diode 66 discharges the input capacitance of the circuit rapidly after each sweep to prevent the starting position of the electron beam from shifting to right or left with changes in the repetition rate of the enabling pulse.

The velocity of travel of the cathode ray beam from its starting position, across the face of the tube, must be initially adjusted by means of controls 53 and 63 at a rate of about one inch per 100 microseconds. This is accomplished by connecting a 10 kc. square wave signal to the antenna input connection 29, so that one full wave is displayed between each 100 microsecond marker shown on the calibration scale for tube 27.

As best seen in FIG. 9, the range indicator tube 27 is furnished DC power from a conventional voltage divider system and is provided with controls as illustrated to adjust focus, brightness and vertical position of the sweep. It is important to note, however, from both FIGS. 2 and 9 that the vertical plates of the tube 27 are connected through capacitances 67 to conductors 68 from a 30-cycle triangular wave generator 69, the voltage output of which is variable by a potentiometer (not shown). The purpose of the 30-cycle triangular wave generator is to gradually deflect the beam in a vertical direction, providing a different vertical starting position for the sweep of the beam whenever a new signal pulse passes through the amplifier.

*Operation of the range indicator circuit and tube*

In describing the operation of the range indicator circuit and tube, it will be assumed, referring again to FIG. 1, that a sferic has originated at the storm cell 20 and is traveling toward the station 22 in the form of the ground wave 23 and the sky wave 24. As will be evident, by virtue of the longer distance traveled by the sky wave and the fact that both move at the same velocity, the ground wave will arrive at the station (and be picked up by the vertical antenna 29) sometime prior to the sky wave. In other words, the sky wave of any given sferic trails the corresponding ground wave in its arrival at the observation station, the time differential depending on the distance from the cell to the station.

By a series of tests and experiments conducted over several years I have been able to determine that the effective height of the D-layer, for purposes of refracting strong ELF sferic signals can normally be predicted in relation to sunset time at a position on the earth immediately below the refracting area of the D-layer. FIG. 12 is a graph of the height of the D-layer, in kilometers, from one hour before to three hours after sunset time. A corresponding change takes place at sunrise when the layer descends over a period of about half an hour. At all other times, the daytime effective height is 63 km. and the nighttime effective height 83 km.

Figure 13:
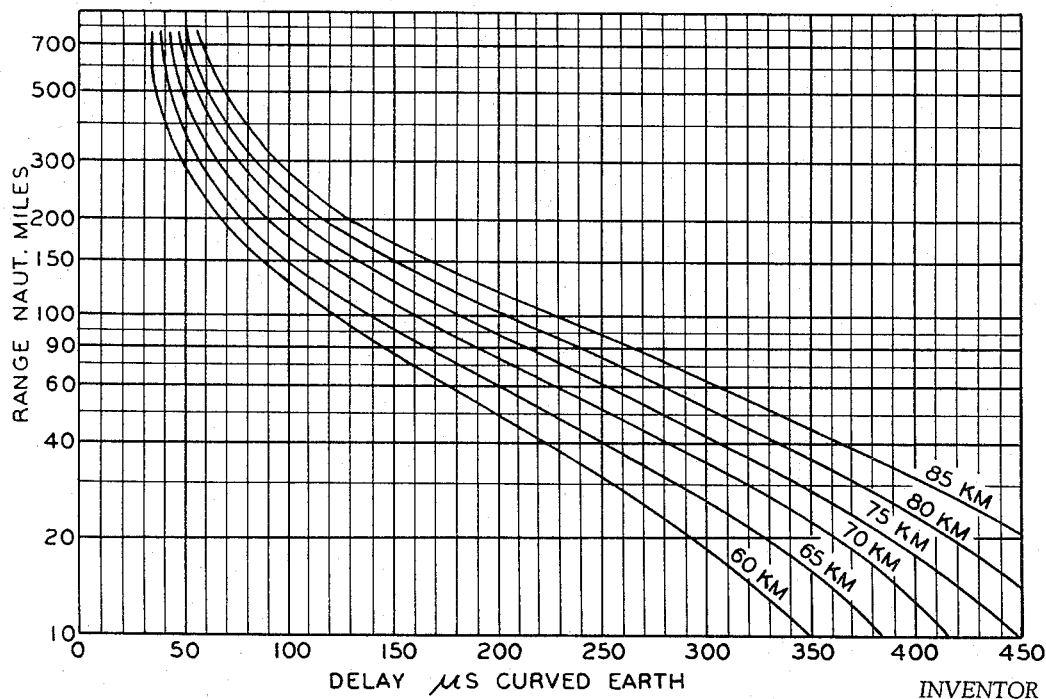
FIG. 13 is a plot of curves of delay time in microseconds versus range (in nautical miles) at various heights for the D-layer.

It is therefore possible to utilize the time differential between the arrival of the ground wave and the sky wave to calculate the distance between the receiving station and the sferic discharge. The formula is:

$$\Delta t = \frac{R_e}{c}\left[2\sqrt{2\left(1+\frac{h}{R_e}\right)\left(1-\cos\frac{\varphi}{2}\right)+\left(\frac{h}{R_e}\right)^2} - \frac{d_g}{r_e}\right]$$

where $d_g$=distance traveled by the ground wave, $R_e$=radius of earth, $\Delta t$=time difference between arrival of sky and ground waves, $c$=speed of light, $h$=effective height of the D-layer and $\varphi$=the angle between the receiving station, the center of earth and the signal source. This relationship may be shown by a group of curves of delay time (in microseconds) versus range (in nautical miles) at the various expected heights of the D-layer (see FIG. 13).

The electronic comparison of the arrival times of the ground wave and its corresponding sky wave in the range indicator circuit and the visual display of the differential is achieved in the fashion hereinafter described.

The signal from the arriving ground wave is filtered, demodulated and passed through the system to trigger the sweep of the electron beam across the screen of the tube 27. The direction of sweep is from right to left as viewed in FIG. 2.

Some microseconds following the arrival of the ground wave, the exact time differential depending on the distance R and the height $h$, the corresponding sky wave arrives and is received. As earlier noted, because of the refractive effect of the D-layer, the phase polarity of the sky wave is reversed from the corresponding ground wave. As a consequence, a distinctive dip, illustrated at D, D', D'' in FIG. 2, occurs on the traces T, T', T''.

It is quite usual for a plurality of cloud-to-ground strokes in an active cell to occur within a few thousandths of a second. As we have earlier noted, the 30-cycle triangular wave voltage produced by the generator 69 displaces the vertical elevation of the starting point of each succeeding sweep. The rate of displacement is sufficiently slow that each stroke will produce a separate trace vertically displaced with respect to its preceding trace as illustrated at T, T', T'' in FIG. 2. This provides a clear showing of the dips, as their presence is visually amplified by the vertical alignment in the successive traces.

In order that the range dips will remain visible for one to two seconds, a relatively long persistence screen coating is used in tube 27. A P-7 coating has been found quite satisfactory.

The dips produced on the traces by the sky wave vary in shape and these become familiar with experience and observation. However, the location on the trace of the point of vertical deflection of the maximum amplitude of the dip is the range mark point and it is this point which is to be compared with the scale in order to determine the range.

Occasionally, two dips may be observed on the same trace which can be caused by double hop reflections of the sky wave. The first dip succeeding commencement of sweep is the one to be used. Also, at relatively short range the dips occasionally become reversed, or appear as "pips," and these may also be used as range markers.

Because of interference problems caused by local invasions of high strength, high frequency sferics included in nearby storms, I have found that the range part of the system becomes unreliable and difficult to read below a range of 40 miles. The system finds its most reliable range between 40 miles and up to and including 900 miles.

*The azimuth indicator system*

Referring again to FIG. 2, and also to FIG. 10, the azimuth indicator might accurately be otherwise described as an instantaneous cathode-ray radio direction finder operating in the ELF portion of the radio spectrum. As earlier noted, the tube 26 thereof is mounted in close proximity to the range indicator tube 27 so that the signals received simultaneously on each may be compared visually by a single operator. If desired, the azimuth indicator system can be utilized with a twin gun cathode ray tube, the remaining beam being used to repeat from some other source (not shown) a weather radar plan position indicator presentation. In this way, the two combined may be used to define which weather cells detected both by radar and sferics are electrically active.

The azimuth system includes loop antennas 70 and 71 arranged vertically in 90° relation to one another and oriented respectively in North-South and East-West planes. These antennas are coupled respectively to the horizontal and vertical deflection plates of the tube 26 through amplifiers 72 and 73. The amplifiers are identical in design and, consequently, only one has been shown in detail in FIG. 10.

Referring to FIG. 10, the amplifiers 72, 73 should, for the purposes of long range sferics detection, have a band width response of from 100 to 10,000 c.p.s. The amplifiers are of the push-pull, high gain type designed for operation in such range. The ground connections for each tube 74, 75 and 76 should be made at a common point and the input and output circuits should be spaced as far apart as possible. Chance feedback and consequent oscillation will also be minimized by keeping the tubes widely separated. The coupling filter, made up of appropriate resistors and capacitors, is used in the plate circuits of both amplifier stages to prevent spurious currents from entering the units from the power supply.

The balanced signal amplifiers used in each stage provide one very important feature of the invention and that is that the relative phase of the output signal from each loop antenna not be shifted in its passage through the amplifier.

It is obvious that if the signal source is from a direction at right angle to the vertical plane of one of the loops, no response will be obtained from that loop and no deflection of the cathode ray tube plates connected to that loop will take place while the opposite loop will produce maximum deflection of the plates associated with it. As the signal source is moved on a radius around the loops, the relative signal voltage in one will increase while that of the other will decrease. Ordinarily, this would produce a moving diametrical line across the face of tube 26.

A diametrical line alone, however, is of little value since it would have a 180° ambiguity. In order to resolve the ambiguity, I apply the signal from the vertical antenna 39, suitably amplified through the sense amplifier 77 (FIG. 1), to the grid 78 of the tube 26 in order to intensity modulate the electron beam. The signal from the sense amplifier is 90° out of phase with the signal from each of the loop amplifiers. The grid voltage is biased to near cutoff and, consequently, the effect of the signal from the sense amplifier is to black out one radius of the line on the tube face while the intensity of the opposite radius varies from very little near the center to a maximum at the end as illustrated by line 79 in FIG. 1.

The bearing lines on the tube face may vary in length, depending on the distance to the signal source and the power radiated by the particular lightning stroke. Because the loops have no null signal response direction for a signal arriving at an angle from the horizontal, such as a sferic pulse reflected from the D-layer, this type of signal is displayed as an oval superimposed on a straight line caused by the prior arrival of the ground wave sferic signal. A cloud-to-cloud horizontal stroke at relatively close range produces a similar oval but without the bisecting straight lines. Thus, it is often possible to distinguish between these types of sferics by means of the direction indicator alone.

It will be understood that the cathode ray tube 26 is equipped with the usual high voltage supply and voltage divider. Focus, brightness and centering controls are provided for the beam.

In order to provide for equalization of the gain of the two loop amplifier channel, both may be connected across one loop by means of a double pole-double throw switch 80 shown in the antenna circuit in FIG. 10. Thereupon, the gain of one of the amplifiers may be reduced until the deflection caused by a received sferics signal produces a line across the face of the tube from 45° to 225°. Then the switch is restored to its original position for operation.

*Overall operation*

In order to obtain both range and directional bearing of the sferics source, the operator watches the azimuth indicator tube 26 until a number of bearing lines such as 79 are repeatedly indicated on the same azimuth. In order to assist in marking this bearing and to provide a record of it, the plastic lens 28 is sleeved over the end of the tube and is rotated until the azimuth radius 28a inscribed thereon matches the bearing line. The compass bearing in degrees, as read from the scale 26a, is noted.

The operator continues to watch this azimuth, moving his eyes to the range indicator tube 27 each time a bearing line is seen. If cloud-to-ground strokes, or strong vertical intracloud discharges, are producing the line, corresponding and simultaneous range dips D will be seen on the range scope. Repeated observations will confirm that the same azimuth line produces the same dip and the delay time in microseconds is read from the scale on the face of the range indicator tube. The currently effective height of the D-layer is then determined from FIG. 12; this information, together with the delay time, is then applied to FIG. 13 and the distance to the signal source determined.

Occasionally, two storms may appear on the same azimuth, one behind the other. This will produce range dips at two different points along the trace T and the location of both sferic sources can be determined. This cannot ordinarily be done with weather radar because of the screening effect of precipitation in the nearer storm.

As earlier suggested, a sferics azimuth indication without a corresponding range dip will usually indicate a cloud-to-cloud stroke. Such an indication is contrary to the type producing pronounced range dips and is rarely associated with the presence of a developing active or declining storm cell. In a period of heavy, low-overcast weather, often accompanied by or followed by protracted rain or drizzle, many sferics sources can be detected without corresponding range dips. This again will indicate that the strokes are cloud-to-cloud and that there are no turbulent, highly active thunderstorms in the overcast.

Also as earlier mentioned, both the sferics azimuth system and the output of a plan position indicator for weather radar can be connected to a single twin-gun cathode ray tube with a long persistence screen. With the usual amber screen over the tube, the radar information may be read alone and with the amber screen removed, the sferics azimuth lines can be seen pointing towards particular weather cells shown by the radar. Thus, the electrically active cells can be distinguished from those that are inactive and, therefore, for the time being less turbulent. Azimuth indications can still be compared with the sferics range scope to confirm radar fixes on particular cells.

From the foregoing, it will be seen that I have accomplished all of the objectives of the invention. I have made possible the location of cloud-to-ground and strong, vertical intracloud lightning discharges from a single station and by a single operator by visual and immediate means. The invention also provides means to distinguish between storm cells of high electrical activity that produce strong vertical lightning strokes and range dips on the trace of the oscilloscope range indicator, from the lower-intensity cloud-to-cloud strokes. The low frequency modulation of the vertical plates of the range indicator permits repeated range dips to be displaced in a herringbone fashion one above the other for comparision and assists in furthering the accuracy of the range indication. Both range and bearing of the radiation source can be determined visually and immediately upon occurrence of the disturbance. Also, sferics azimuth indications can be utilized and compared with radar weather plan position indicator scopes.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a system for obtaining at a single station simultaneous visually determinable range and bearing fixes on a geographically remote source of vertically polarized, high amplitude pulses of electromagnetic radiation in the ELF (extremely low frequency) range, the combination of means at said station for receiving and translating an ELF pulse from said source into a visible indication of the direction of said source from said station, and means in close proximity to the first-named means for automatically measuring and visibly indicating the time lapse between the arrival at said station of the ground wave and sky wave, respectively, of said pulse.

2. In a system as in claim 1, the first-named means comprising a radio direction finder terminating in a cathode ray tube producing a line indication of said bearing, and the last named means including a second cathode ray tube disposed adjacent said first tube.

3. In a system for obtaining at a single station simultaneous visually determinable range and bearing fixes on a geographically remote source of vertically polarized, high amplitude pulse of electromagnetic radiation in the ELF (extremely low frequency) range, the combination comprising a first cathode ray tube, receiving means for producing in response to an ELF pulse from said source a line indication on the screen of said first tube whose angular position corresponds to the true bearing of said source, a second cathode ray tube disposed with its screen in close proximity to and visible from the same direction as the screen of said first tube, receiving means for triggering a linear sweep of the cathode beam of said second tube at a determined rate across the screen of said second tube in response to reception of the ground wave of said pulse, and means for deflecting said beam in a direction transverse to the direction of sweep in response to reception of an ionosphere-refracted or scattered sky wave of said pulse.

4. In a system as in claim 3, a time scale on said second tube calibrated to indicate, by means of the deflection of the beam by the reflected pulse wave, the travel time differential from said source between said ground wave and sky wave.

5. In a system as in claim 3, means operable to displace successive sweep lines vertically on said screen of the second tube.

6. In a system as in claim 3, rotatable marking means associated with said first tube and adjustable to match with and maintain the angular position of said line indication.

7. In a system for obtaining at a single station simultaneous visually determinable range and bearing fixes on a geographically remote source of vertically polarized, high amplitude pulses of electromagnetic radiation in the ELF (extremely low frequency) range, the combination comprising a directional loop antenna assembly, a fixed cathode ray tube having pairs of opposed beam deflection plates, means applying the output from the antenna loops respectively to the different pairs of said plates, said means including a pair of two-stage, push-pull audio amplifiers, one connected with each loop of the antenna, a vertical antenna, means connected with said vertical antenna and operable to apply the output thereof, 90° out of phase with both loop amplifiers, to the grid of said tube to intensity modulate the cathode beam and limit the trace on said tube to a linear radial trace rather than diametric, a second cathode ray tube in close proximity to said first tube, and means connected with and operated responsive to reception of the ground wave and sky wave of said pulse at said vertical antenna to cause a range indicator line to be displayed on said second tube substantially simultaneously with the corresponding pulse trace on said first tube.

8. In the system as in claim 7, the last-named means including means for triggering a linear sweep of the cathode beam across said second tube in response to the output of said vertical antenna to the arrival of the pulse ground wave and means for deflecting said beam in a direction transverse to said sweep upon reception at said vertical antenna of a pulse wave refracted and scattered from the ionosphere.

9. In a system as in claim 8, a time scale on said second tube calibrated to indicate, on the deflection of the beam by the reflected pulse wave, the travel time differential from the source between said ground wave and sky wave.

10. In a system as in claim 7, means operable to displace successive sweeps of the cathode beam of said second tube vertically from one another.

11. In a system as in claim 7, rotatable marking means associated with said first tube and adjustable to match and maintain the angular position of said line indication.

12. In a system for obtaining at a single station simultaneous visually determinable range and bearing fixes on a geographically remote source of pulses of vertically polarized, high amplitude electromagnetic radiation in the ELF (extremely low frequency) range, the combination comprising a vertical antenna; a range indicator cathode ray tube including a cathode ray beam, a display screen and horizontal and vertical beam deflecting means; control means connected between said antenna and the horizontal deflecting means of said tube and including sweep means connected with said horizontal beam deflecting means operable to sweep said beam across said screen at a selected rate and trigger means operable to initiate said sweep means upon reception of the output of said antenna resulting from the ground wave of said pulse; circuit means connecting said antenna and the vertical deflecting means of said tube whereby to supply the voltage of said output to said vertical deflecting means; an azimuth indicator cathode ray tube disposed closely adjacent said range indicator tube and having a display screen visible from the same direction as the display screen of said range indicator tube; and a pulse receiving means connected with said azimuth indicator tube and operable to create an azimuth indicating line on the screen of said azimuth indicator tube substantially simultaneously with the sweep of the beam in the range indicator tube.

13. In a system as in claim 12, a time scale on said second cathode ray tube calibrated to indicate, on the deflection of the beam in a vertical direction by the ionosphere-refracted and scattered wave of a pulse, the travel time differential from the source between the ground wave and said refracted wave.

14. In a system as in claim 12, means operable to displace successive sweep lines vertically on the screen of said range indicator tube.

15. In a system as in claim 12, rotatable marking means associated with said azimuth indicator tube and adjustable to match with and maintain the position of said indicator line after said line has faded from the said screen.

16. In a system for obtaining range fixes at a single station on a remote source of electromagnetic radiation radiating vertically polarized, high amplitude pulses in the ELF (extremely low frequency) range, the combination comprising a cathode ray tube, an antenna, means connecting the output of said antenna with said tube and operable to trigger a linear sweep of the cathode ray beam at a predetermined rate across said tube in response to the reception of the ground wave of a pulse from said source, and means also connected between said antenna and said tube and operable to deflect said beam in a direction transverse to the direction of sweep in response to reception at said antenna of a phase shifted wave of said pulse refracted from the ionosphere.

17. In a system as in claim 16, a time scale on said tube arranged to coincide with the path of sweep and calibrated to indicate on the deflection of the beam by the refracted wave the travel time differential from the source between said ground wave and refracted wave.

18. In a system as in claim 16, means operable to displace successive sweep lines vertically in said tube with respect to one another.

References Cited
UNITED STATES PATENTS 2,883,663   4/1959   Kessler et al. _____ 343—123

OTHER REFERENCES

Adcock and Clarke, "The Location of Thunderstorms by Radio Direction Finding," Institution of Electrical Engineers (British), vol. 49, Part III, 1947, pp. 118–125.

RODNEY D. BENNETT, *Primary Examiner.*

R. E. BERGER, *Assistant Examiner.*